United States Patent
Araujo, Jr. et al.

(10) Patent No.: US 7,996,834 B2
(45) Date of Patent: Aug. 9, 2011

(54) VIRTUAL MACHINE SELF-SERVICE RESTRICTIONS

(75) Inventors: Nelson S. Araujo, Jr., Redmond, WA (US); Abhishek Dhasmana, Redmond, WA (US); Lloyd Gene Giberson, Kirkland, WA (US); Angel Monterrubio, Redmond, WA (US); John Chad Parry, Newcastle, WA (US); Eugene Polonsky, Redmond, WA (US); Brian Michael Wahlert, Bellevue, WA (US); Kendra Anne Yourtee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1341 days.

(21) Appl. No.: 11/404,334

(22) Filed: Apr. 14, 2006

(65) Prior Publication Data

US 2007/0245348 A1    Oct. 18, 2007

(51) Int. Cl.
   *G06F 9/455*    (2006.01)
(52) U.S. Cl. .......................................................... 718/1
(58) Field of Classification Search .......................... None
   See application file for complete search history.

(56) References Cited

U.S. PATENT DOCUMENTS

| | | | | |
|---|---|---|---|---|
| 5,201,049 A | | 4/1993 | Shorter | 395/650 |
| 5,291,597 A | | 3/1994 | Shorter et al. | 395/650 |
| 5,572,694 A | | 11/1996 | Uchino | 395/406 |
| 6,101,616 A | | 8/2000 | Joubert et al. | 714/11 |
| 6,167,520 A | * | 12/2000 | Touboul | 726/23 |
| 6,212,629 B1 | | 4/2001 | McFarland et al. | 712/241 |
| 6,480,962 B1 | * | 11/2002 | Touboul | 726/22 |
| 7,500,053 B1 | * | 3/2009 | Kavuri et al. | 711/114 |
| 7,620,630 B2 | * | 11/2009 | Lloyd et al. | 1/1 |
| 2003/0065676 A1 | * | 4/2003 | Gbadegesin et al. | 707/104.1 |
| 2004/0128670 A1 | | 7/2004 | Robinson et al. | 718/1 |
| 2004/0148514 A1 | * | 7/2004 | Fee et al. | 713/200 |
| 2004/0230829 A1 | * | 11/2004 | Dogan et al. | 713/200 |
| 2005/0172156 A1 | * | 8/2005 | Gbadegesin et al. | 713/201 |
| 2005/0198632 A1 | | 9/2005 | Lantz et al. | 718/1 |
| 2006/0190987 A1 | * | 8/2006 | Ohta et al. | 726/1 |
| 2007/0239987 A1 | * | 10/2007 | Hoole et al. | 713/169 |

FOREIGN PATENT DOCUMENTS

WO    WO 2005/036383 A2    4/2005

OTHER PUBLICATIONS

Connection Management, Programming WebLogic Server J2EE Connectors, © 2006 BEA Systems, 8 pages.
Whitaker, A. et al., "Scale and Performance in the Denali Isolation Kernel", 15 pages.

* cited by examiner

*Primary Examiner* — Emerson C Puente
*Assistant Examiner* — Adam Lee
(74) *Attorney, Agent, or Firm* — Woodcock Washburn LLP (57) ABSTRACT

The embodiments contemplate a system and method for a restriction of virtual machines for a group of one or more users. A predefined policy may include a restriction related to the group, as well as a measure of enforcement to initiate in the event of a violation of the restriction. The measure of enforcement may include a warning message or denial of resources. The restriction may be resource-based, time-based, machine-based, or a combination. The restriction may be a group-level restriction, in which the entire group actions are monitored, or a user-level restriction, in which the user's actions are monitored. In the event a user is assigned to more than one group, the policies of each group are assigned a priority level. The priority level dictates the restriction as well as the measure of enforcement.

16 Claims, 5 Drawing Sheets

VIRTUAL MACHINE SELF-SERVICE RESTRICTIONS

BACKGROUND OF THE INVENTION

A virtual machine is a software construct or the like operating on a computing device or the like for the purpose of emulating a hardware system. Typically, although not necessarily, the virtual machine is an application or the like and is employed on the computing device to host a user application or the like while at the same time isolating such user application from such computing device or from other applications on such computing device. A different variation of a virtual machine may for example be written for each of a plurality of different computing devices so that any user application written for the virtual machine can be operated on any of the different computing devices. Thus, a different variation of the user application for each different computing device is not needed.

New architectures for computing devices and new software now allow a single computing device to instantiate and run a plurality of partitions, each of which can be employed to instantiate a virtual machine to in turn host an instance of an operating system upon which one or more applications may be instantiated. Typically, although not necessarily, the computing device includes a virtualization layer with a virtual machine monitor or the like that acts as an overseer application or 'hypervisor', where the virtualization layer oversees and/or otherwise manages supervisory aspects of each virtual machine and acts as a possible link between each virtual machine and the world outside of such virtual machine.

Among other things, a particular virtual machine on a computing device may require access to a resource associated with the computing device. As may be appreciated, such resource may be any sort of resource that can be associated with a computing device. For example, the resource may be a storage device to store and retrieve data, and generally for any purpose that a storage device would be employed. Likewise, the resource may be any other asset such as a network, a printer, a scanner, a network drive, a virtual drive, a server, a software application, and the like. Accordingly, whatever the resource may be, the virtual machine may in fact be provided with access to services provided by such resource.

One or more administrators may be responsible for the management of virtual resources among multiple users. Various difficulties with the management of such resources may ensue, such as a timely allocation of requested resources and a fair distribution of access to the resources among the users.

Neither uncontrolled access nor strictly-regulated access are desirable options for the management of virtual machine resources. Providing uncontrolled access of the resources is not a desirable option as such access may result in some users consuming more resources than desired by the administrator. Furthermore, a strict management policy overseen by the administrator, in which management of virtual resources is closely regulated, may be time-consuming and unnecessary. An administrator may not need to grant permission or access for every resource desired by a user, but such an act is compulsory if a strict management policy is enforced.

Thus a self-service restriction system in which the administrator creates a policy for a user indicating the rights desired for the user is highly desirable.

SUMMARY OF THE INVENTION

A virtual machine self-service restriction method and system operate to manage virtual machine resources by defining a policy for a group of users. The policy may include a restriction related to the group and its access to the resources. A measure of enforcement, in which to initiate in the event of a violation of the restriction, is also specified in the policy. The restriction may be resource-based, time-based, machine-based, or a combination thereof. The restriction may be a group-level restriction or a user-level restriction. In the event a user is assigned to more than one group, the policies of each group are assigned a priority level. The priority level dictates the restriction as well as the measure of enforcement to be monitored and taken, respectively.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description are better understood when read in conjunction with the appended drawings. Exemplary embodiments are shown in the drawings, however it is understood that the embodiments are not limited to the specific methods and instrumentalities depicted therein. In the drawings.

DETAILED DESCRIPTION OF ILLUSTRATIVE EMBODIMENTS

Computer Environment

Figure 1:
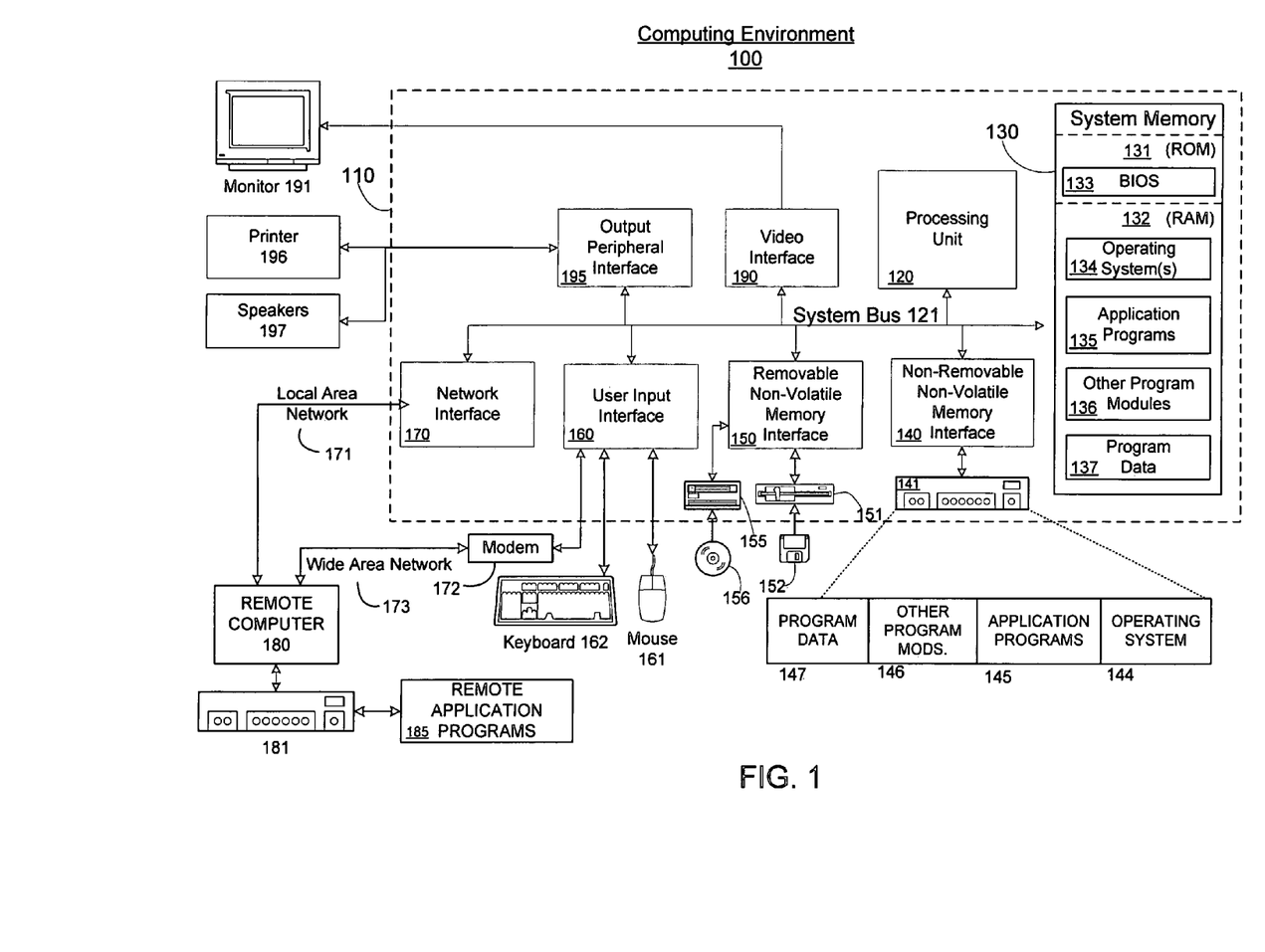
FIG. 1 is a block diagram representing an exemplary computing device in which the present invention may be implemented.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such, as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by the processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as an interface 140, and the magnetic disk drive 151 and the optical disk drive 155 are typically connected to the system bus 121 by a removable memory interface, such as an interface 150.

The drives and their associated computer storage media, discussed above and illustrated in FIG. 1, provide storage of computer readable instructions, data structures, components, program modules and other data for the computer 110. In FIG. 1, for example, the hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147, are given different numbers here to illustrate that, at a minimum, they are different copies. A user may enter commands and information into the computer 110 through input devices such as a keyboard 162 and a pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote, application programs 185 as residing on memory device 181. It will be appreciated that the network connections shown are exemplary and other means of establishing a communications link between the computers may be used.

All or portions of the methods of the present invention described above may be embodied in hardware, software, or a combination of both. When embodied in software, the methods of the present invention, or certain aspects or portions thereof, may be embodied in the form of program code that when executed by a computing system cause the computing system to perform the methods of the present invention. This program code may be stored on any computer-readable medium, as that term is defined above.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation or execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
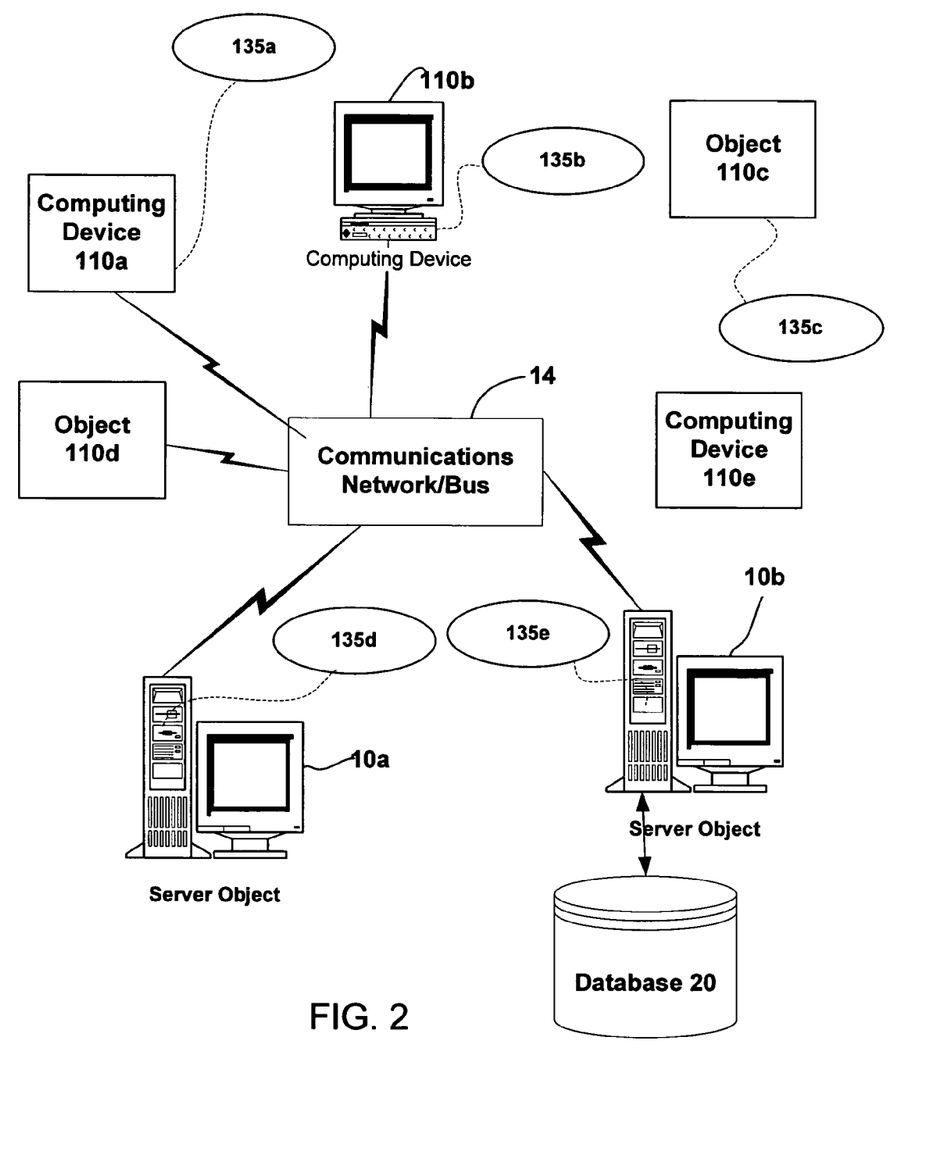
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wire-line or wireless systems, by local networks or widely distributed networks. Currently, many of the networks are coupled to the Internet, which provides the infrastructure for widely, distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers processing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing, the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source, and to any computing device with which it is desirable to render high performance graphics generated by a virtual machine.

In a network environment in which the communications network/bus 14 is the Internet, for example, the servers 10 can be Web servers with which the clients 110*a*, 110*b*, 110*c*, 110*d*, 110*e*, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110*a*, 110*b*, etc. that can access and interact with a computer network/bus 14 and server computers 10*a*, 10*b*, etc. that may interact with client computers 110*a*, 110*b*, etc. and other devices 111 and databases 20.

Virtual Machine Self-Service Restriction

Figure 3:
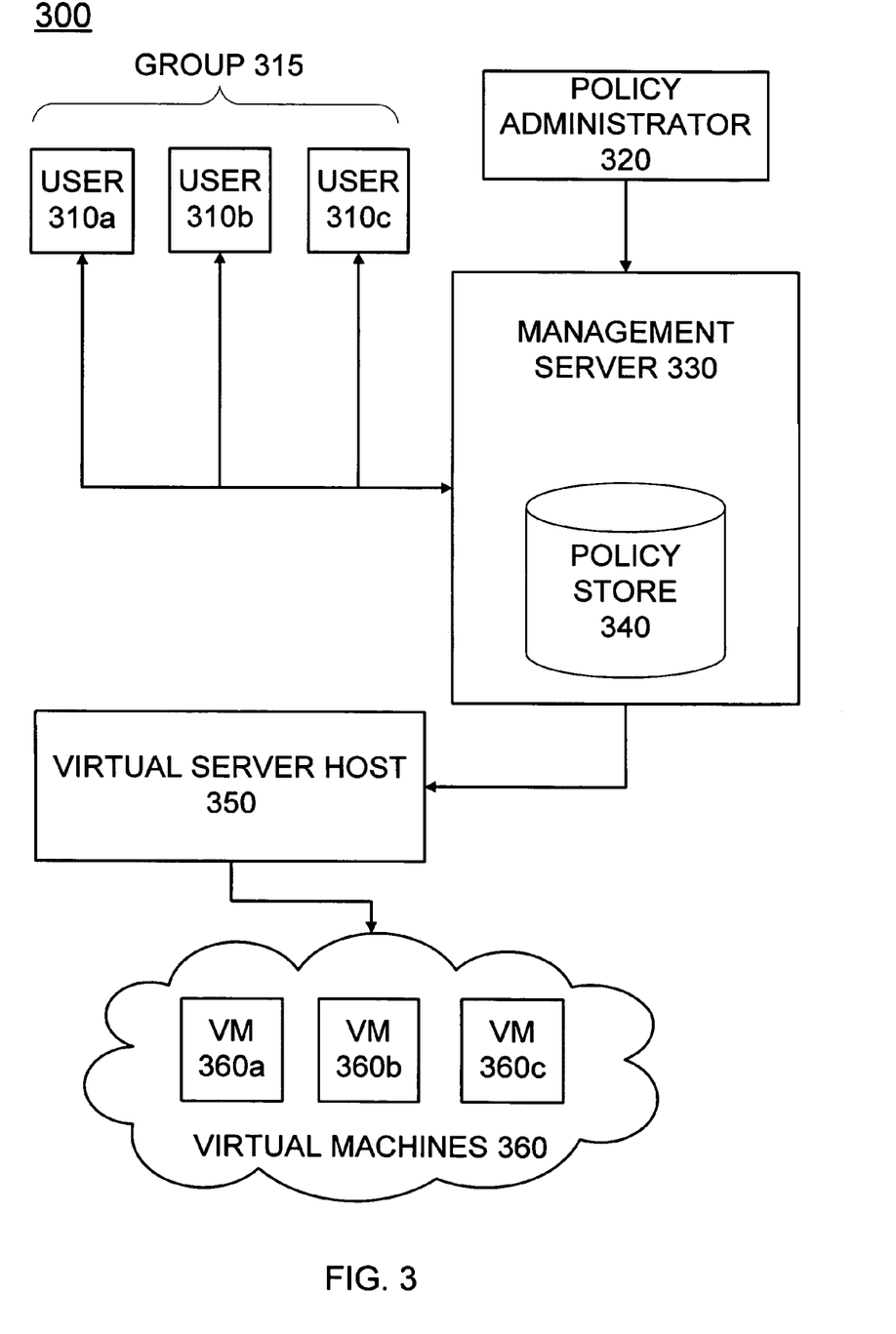
FIG. 3 is a block diagram representing a virtual machine self-service restriction system in accordance with embodiments of the present invention.

A mechanism for the creation, management, and employment of self-service restrictions for a virtual machine administrator and users is desired in order to efficiently manage resources of the virtual machines. A virtual machine self-service restriction system 300 to achieve this goal is illustrated in FIG. 3. Users 310*a*, 310*b*, and 310*c* form a subject or group 315, although the size of the group 315 is not so limited and more or fewer users 310 may be part of the group 315. The users 310 may be for example organizational units, programs, or services that can be identified by the system 300. A policy administrator 320 is responsible for defining a policy for the group 315. A management server 330 creates the policy in accordance with the desired policy information provided by the policy administrator 320.

The policy administrator 320 of the virtual machine self-service restriction system 300 may be responsible for defining a policy for more than one group 315. The policy may be specially-defined according to one or more functions of the group 315. For example, the group 315 may desire access to a number of virtual machines 360, and the policy may accordingly be defined to efficiently employ various resources of the virtual machines 360. The virtual machine self-service restriction system 300, as shown in FIG. 3, depicts three virtual machines 360, virtual machines 360*a*, 360*b*, and 360*c*, although the number of virtual machines 360 is not so limited.

The policy, as created by the policy administrator 320, specifies the group 315 to which the policy applies. In addition, the policy also includes a restriction related to the group 315 and a measure of enforcement to be taken if the restriction is violated. A policy for one group 315 may differ than that for a second group 315 or the policy of each group 315 may be equivalent or nearly equivalent.

With the policy information (i.e. the policy) provided by the policy administrator 320, the management server 330 creates the policy for the group 315 and stores the policy in a policy store 340, such as for example a database. Although shown as part of the management server 330 in FIG. 3, the policy store 340 may be a separate component running on the same or a separate computer. The policy store 340 serves as a reference for the management server 330 upon action by the group 315, for example upon action relating to an addition of a virtual machine 360 by a user 310 belonging to the group 315. When the group 315, or a user 310 of the group 315, performs an action relating to one or more of the virtual machines 360, the management server 330 accesses the policy relating to the group 315 from the policy store 340. The management server 330 determines, upon review of the policy, and in particular the restriction component of the policy, if the action constitutes a violation of the restriction. If the policy, and in particular the restriction of the policy, is not violated, then the management server 330 determines that the attempted action by the group 315 is allowable. Furthermore, the management server 330 may take the attempted action on behalf of the group 315. The management server 330 may convey information to a virtual server host 350, indicating that an attempted action by the group 315 is allowable, and the virtual server host 350 may perform the action on behalf of the group 315.

If, however, the management server 330 determines that the attempted action by the group 315 violates the restriction of the policy, the attempted action may not be taken. Instead, the management server 330 may take the measure of enforcement as defined by the policy relating to the group 315. The measure of enforcement may include a message to the group 315 that the attempted action violates the policy as defined by the policy administrator 320. Alternatively, the management server 330 may determine that an exception may be made and may accordingly allow the attempted action to be initiated. Other enforcement actions are also possible.

A user 310, such as user 310*a*, 310*b*, or 310*c*, may be part of more than one group 315. As such, the user 310 belonging to the group 315*a* and the group 315*b* may be assigned conflicting policies. For example, suppose policy a relates to the group 315*a*, while policy b relates to the group 315*b*. Further suppose that the user 310*b* belongs to both the group 315*a* as well as the group 315*b*. The restriction of policy a may limit memory usage to 8 gigabytes of RAM, while that of policy b may limit memory usage to 10 gigabytes of RAM. In such a case, it may be necessary to assign a priority level to each policy. For example, policy a may be assigned a lower priority level than that of policy b. In the event that the user 310*b* exceeds a memory usage of 8 gigabytes with reference to the virtual machines 360, the management server 330 accurately determines that the restriction of policy a is violated. However, before continuing with the policy-defined measure of enforcement according to policy a, the management server 330 determines that the user 310*b* is also a member of group 315*b* and that the restriction of policy b is not violated. Upon further evaluation with respect to the assigned priority levels of the policy a and the policy b, the management server 330 notes that policy b is assigned a higher priority level than that of policy a. Accordingly, since policy b is not violated, the management server performs, or allows the performance of, the attempted action by the user 310*b*.

The priority level related to the policy may be a pessimistic policy in which the most restrictive policy is assigned the highest priority. For example, if the user 310*b* is assigned 10 gigabytes of RAM on policy 1 and 8 gigabytes of RAM on policy 2, then the virtual machine self-service restriction system 300 allows only 8 gigabytes for the user 310*b*. Alternatively, a less restrictive policy (i.e. an optimistic policy) may be applied in which the least restrictive policy is assigned the highest priority level. The system 300 will then allow, using the example policy 1 and policy 2 described above, 10 gigabytes of RAM to the user 310*b*.

The above policy priority scenarios are set forth only as examples and are not meant to serve as limitations. Other variations are possible. For example, the priority level assigned to each policy may be reversed. The user 310b may belong to three or more groups, in which case a priority level for each group is defined. In other variations, a higher priority level may be assigned to a more restrictive policy or to a less restrictive policy. In another example, the restriction values may be added to form a new restriction.

A policy may be evaluated with allow and deny lists. When a specific restriction is met, the system 300 stops the policy evaluation, and if a restriction is not met, the system 300 evaluates another restriction. This allows restrictions to be mixed. For example, an allow list may include the following:

1) If user is "user 310a", allow the creation of any virtual machine 360;
2) On host 350 named host1, allow the creation of only two virtual machines 360 for any given user 310;
3) If user 310 is "Network Operations," allow user 310 to disable any network configuration; and
4) Deny any other request (default rule).

The restriction of the policy may be resource-based, time-based, or machine-based. The restriction may include several components, such as a resource-based component and a time-based component. Other combinations of the restrictions, as well as types of the restrictions, are also possible. In the case of a resource-based restriction, the group 315 for which the restriction is defined may be limited to a certain amount of resources, such as, for example and not limitation, CPU usage, network bandwidth, disk usage, or memory usage. In a resource-based restriction, the restriction may be applied to the group 315 or to one of each user 310 of the group 315. For example, the restriction may state, "the group 315c cannot create virtual machines 360 totaling more than 8 gigabytes of RAM." Or the restriction may include user 310 restrictions, such as, "the user 310c cannot create virtual machines 360 totaling more than 4 gigabytes of RAM." Or a combination of the restrictions may be dictated by the policy administrator 320, such as, "the group 315a cannot create virtual machines 360 totaling more than 8 gigabytes of RAM, and the user 310a cannot create virtual machines 360 totaling more than 2 gigabytes of RAM." In addition, resource-based restrictions may either limit the aggregate resources used by a user 310 or group 315 across all virtual machines 360, or may limit the resources used per virtual machine 360. An example of this latter type of restriction: "The user 310a cannot create any single virtual machine using more than 1 gigabyte of RAM."

A time-based restriction may limit the lifetime of the virtual machines 360. An example of a time-based restriction may be: "Virtual machines 360 created by group 315a may exist for up to 14 days." A type of time-based restriction may be referred to as a pure time-based restriction. In a pure time-based restriction, the measure of enforcement, as defined by the policy administrator 320 and enforced by the management server 330, is taken when the defined time has elapsed. An idle time-based restriction is another type of time-based restriction. In this case, the measure of enforcement is taken after the virtual machines 360 are idle for a predetermined period of time. A time-based restriction may allow grace periods and/or renewal of a lease subject to additional policies. For example, if a virtual machine 360 is not used for 14 days, it may be paused for an additional two days and then deleted by the management server 330. In another scenario, the user 310 may extend an expiration date, which may be subject to other restrictions. For example, the other restrictions may be: "the expiration date may be extended three times, but the total virtual machine 360 lifetime cannot exceed 90 days." A time-based restriction may involve a transmission of a renewal request reminder to the user 310. In addition, the management server 330 may automatically, or with assistance from the policy administrator 320, approve renewal requests.

A machine-based restriction is yet another type of restriction. This restriction limits the number of virtual machines 360 that a group 315 of user 310 of the group 315 to which the policy relates can own at any given time. For example, a machine-based restriction may be, "the user 310b of the group 315c may own no more than three virtual machines 360 running on a particular host, such as the virtual server host 350." A machine-based restriction may also include a system-wide restriction. For example, "group 315 cannot have more than 15 virtual machines 360 regardless of the hosts where the machines 360 reside."

Figure 4:
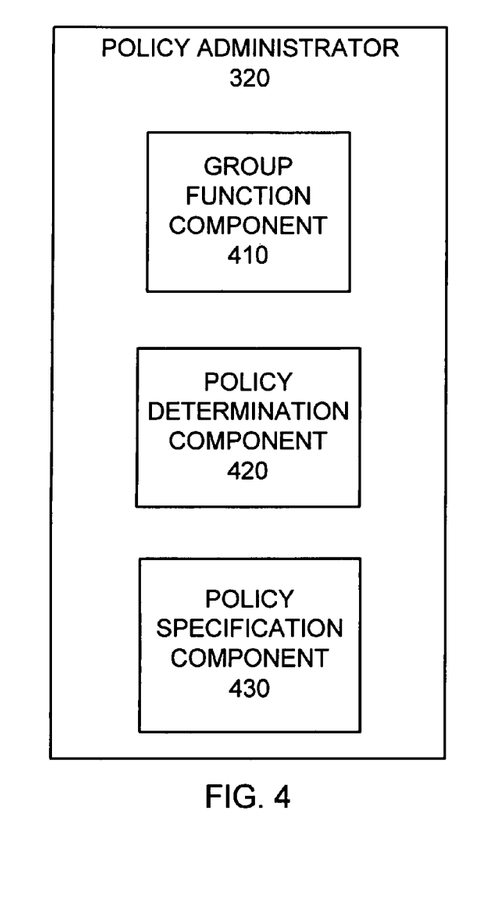
FIG. 4 is a block diagram representing a policy administrator in accordance with one embodiment of the present invention.

FIG. 4 is a block diagram of a policy administrator 320 according to an embodiment of the invention. The policy administrator 320 includes several means, devices, software, and/or hardware for performing functions, including a group function component 410, a policy determination component 420, and a policy specification component 430, which may operate to create and specify a policy relating to a group 315 based upon a function or intended operation or goal of the group 315.

The group function component 410 operates to determine a functionality of the group 315 for which the policy is being defined and created. Groups 315 may contain different processing or management goals and/or purposes related to the virtual machines 360 and may require a policy directed to the particular goal and/or purpose of the particular group 315. Accordingly, the group function component 410 evaluates the function of the group 315 to assist in the determination of possible needs and requirements related to the policy. The group 315 function evaluation may be performed through data collection and analysis with the users 310 and the group 315. The collection may be performed through the management server 330 or directly with the users 310 and the group 315. Additionally, if the function of the group 315 changes, such as by the addition of new or different responsibilities, the users 310 and/or the group 315 may advise the group function component 410 of the new functionality so that the policy may be evaluated and adjusted if necessary. The policy determination component 420 is provided the functionality information of the group 315 by the group function component 410. Based upon this information, the policy determination component 420 determines a policy for the group 315. In addition to the group functionality information, other criteria, such as but not limited to available resources and other group policies, may be considered in creating the policy for the group 315 by the policy determination component 420.

The policy specification component 430 operates to receive the determined policy for the group 315 from the policy determination component 420. The policy specification component 430 provides the policy for the group 315 to the management server 330. Thus, the policy specification component 430 provides a link between the policy administrator 320 and the management server 330. If the policy for the group 315 is adjusted, as discussed in more detail above, then the policy specification component 430 receives the adjusted policy and provides the adjusted policy to the management server 330.

Figure 5:
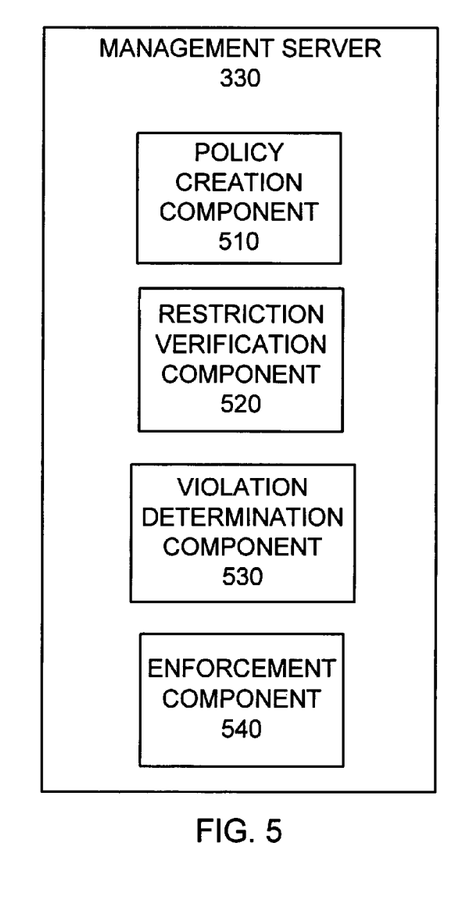
FIG. 5 is a block diagram representing a management server in accordance with one embodiment of the present invention.

FIG. 5 is a block diagram of a management server 330 according to an embodiment of the invention. The management server 330 includes several means, devices, software, and/or hardware for performing functions, including a policy creation component 510, a restriction verification component 520, a violation determination component 530, and an enforcement component 540. The components 510, 520, 530, and 540 may operate to obtain and store a policy relating to a group 315; determine, by accessing the policy, if a violation has occurred; and take a measure of enforcement according to the policy.

The policy creation component 510 may be responsible for creating the policy for the group 315 as specified by the policy administrator 320. The policy creation component 510 receives the desired policy information from the policy specification component 430 of the policy administrator 320, creates the policy, and transfers the policy to the policy store 340. Once stored in the database 340, the policy may be consulted upon action from the group 315 or a user 310 of the group 315. The restriction verification component 520 of the management server 330 may operate to verify the policy of the group 315, and in particular the restriction component of the policy, upon action of the group 315. The restriction verification component 520 obtains the policy, and thus the restriction, related to the group 315 from the policy store 340.

The violation determination component 530 receives the restriction component of the policy from the restriction verification component 520 and operates to determine if the restriction is violated. The violation determination operation may include comparing the attempted action by the group 315, as received at the management server 330 by the violation determination component 530, with the restriction dictated by the policy, as received by the violation determination component 530 from the restriction verification component 520. If the restriction is not violated, then the violation determination component 530 allows the action to be taken. If, however, the violation determination component 530 determines that the restriction is violated, then an indication is sent to the enforcement component 540. The enforcement component 540, upon indication that the group 315 has attempted an action that violates the restriction dictated by the policy, performs an enforcement action, as also dictated by the policy for the group 315. In order to perform the action, the enforcement component 540 consults the policy from the policy store 340. The enforcement action may be for example a warning sent to the group or a retirement of one or more of the virtual machines 360.

Figure 6:
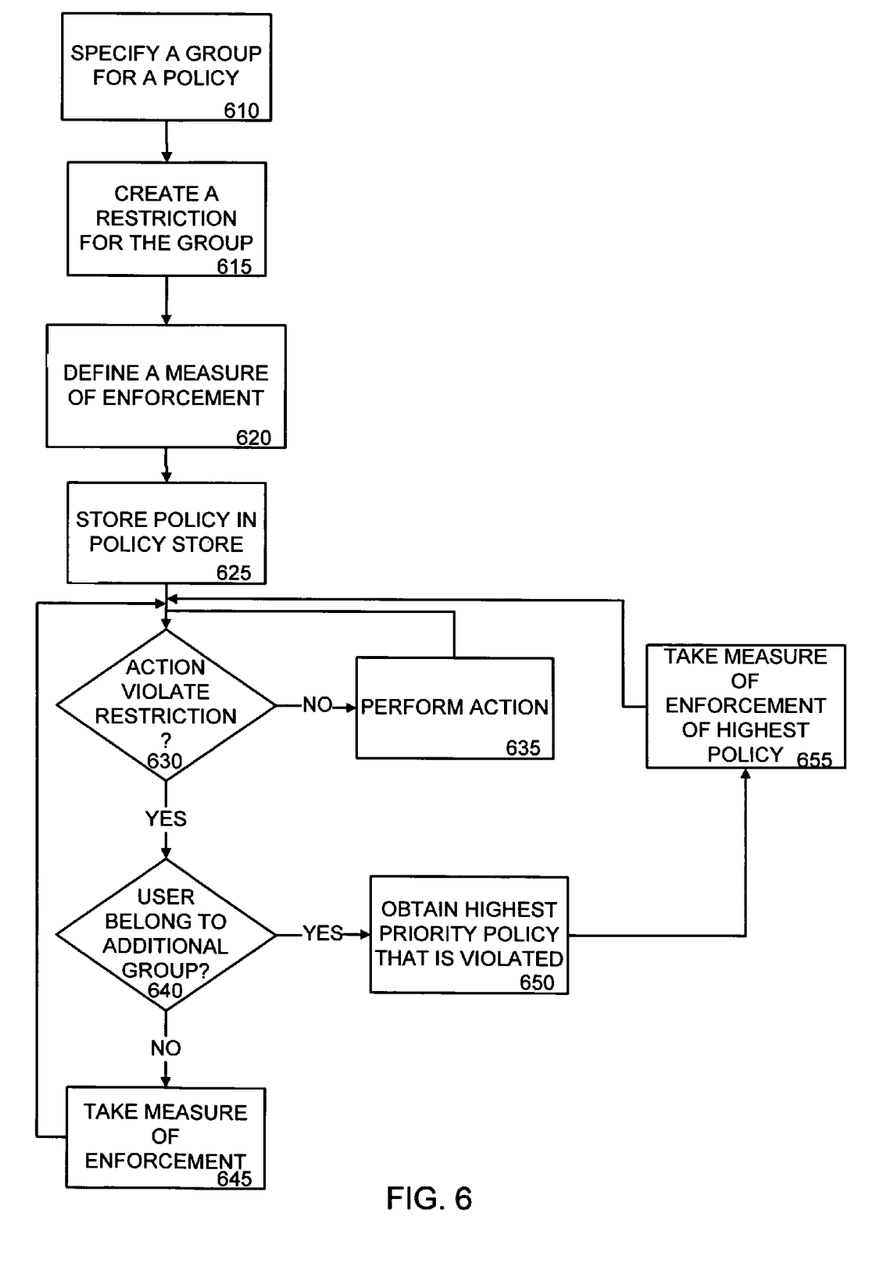
FIG. 6 is a flow diagram illustrating a virtual machine self-service restriction method in accordance with one embodiment of the present invention.

A virtual machine self-service restriction method is described in relation to the flow chart of FIG. 6. A policy for a group 315 is created at 610, 615, and 620. At 610, a group 315 for which the policy is being created is specified. The group function component 410, operating to determine a functionality of the group 315 for which the policy is being defined and created, receives data from the group 315 and/or the users 310 of the group 315. Based upon the group functionality information provided by the group function component 410, the policy determination component 420 determines a policy for the group 315. At 615, a restriction, which is part of the policy, is created for the group 315. At 620, a measure of enforcement, another component of the policy, is defined. The restriction and the measure of enforcement, both of which are described in further detail above, are defined by the policy determination component of the policy administrator 320. At 625, the policy is stored in a store, such as the policy store 340, which may be part of the management server 330 and which may be a database, for example.

Upon action from the group 315, a determination is made at 630 to ascertain if the action violates the restriction as set forth in the policy for the group 315. If the action does not violate the policy restriction, then at 635 the action is performed. After the initiation of the action at 635, the method may proceed to 630 to determine if further actions by the group 315 violate the restriction.

The restriction may specify a restriction based upon a user 310 or users 310 of the group 315, requiring further analysis in order to evaluate if the user or users 310 belong to another group 315. If the user 310 is part of another group 315, then conflicts in the policies, and thus the restrictions, may be present. Accordingly, for users 310 assigned to more than one group, a priority level may be assigned to each group 315 for that particular user 310.

At 640 a subsequent determination is made. This operation involves determining if the user 310 taking the action belongs to an additional group 315. At 645, if the user 310 does not belong to an additional group 315 as determined at 640 by the management server 330, then the measure of enforcement is taken.

Additional operations may be necessary if, as determined at 640, the user 310 belongs to one or more additional groups 315. First, at 650, the policy of the group 315 assigned to the highest priority level that is violated is obtained. This information may be determined and obtained by the management server 330, in part with reference to the policy store 340. At 665 the measure of enforcement according to the highest priority level policy that is violated is taken. After the completion of the measure of enforcement, further monitoring at 630 may be performed in order to analyze future attempted actions by the group 315.

CONCLUSION

In conclusion, the present invention employs a policy that specifies a restriction and measure of enforcement with regard, to a group 315 of user or users 310 accessing or desiring access to the virtual machine or machines 360. The policy allows the policy administrator to create desired restrictions, thereby alleviating the need to monitor every action and resource. If the restriction is violated, then the desired enforcement measure is taken to alert the group accordingly.

As can be appreciated, the disclosed embodiments may be implemented as a whole or in part in one or more computing systems or devices. FIG. 1 illustrates the functional components of one example of a computing system 100 in which aspects may be embodied or practiced. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, handheld computers, programmable consumer electronics, multimedia consoles, game consoles, satellite receivers, set-top boxes, automated teller machines, arcade games, mobile telephones, personal digital assistants (PDAs) and any other processor-based system or machine. The terms "program code" and "code" refer to any set of instructions that are executed or otherwise processed by a processor. Program code and/or data can be implemented in the form of routines, programs, objects, modules, data structures and the like that perform particular functions.

It is noted that the foregoing examples have been provided for the purpose of explanation and are in no way to be construed as limiting. While the invention has been described with, reference to various embodiments, it is understood that the words which have been used herein are words of description and illustration, rather than words of limitation. Although the embodiments have primarily been described with reference to multiple virtual machines, the embodiments are not intended to be limited to multiple virtual machines and in fact one virtual machine may be used without departing from the spirit and scope of the present invention. Further, although the embodiments have been described herein with reference to particular means, materials, and examples, the embodiments are not intended to be limited to the particulars disclosed herein; rather, the embodiments extend to all functionally equivalent structures, methods and uses, such as are within the scope of the appended claims.

What is claimed is:

1. A self-service restriction method with regard to a computing device having a first virtual machine (VM) and a second VM instantiated therein and a VM self-service restriction system, the self-service restriction method being performed by the VM self-service restriction system to efficiently manage resources of the first and second VMs of the computing device being accessed by a group of at least one user, the method comprising:
    obtaining a policy from a policy store, the policy specifying the group of the at least one user, a restriction related to the group, the restriction comprising a restriction of aggregate use of resources across the first and second VM, and a measure of enforcement to be taken if the restriction is violated, the measure of enforcement comprising informing the group of the violation and preventing an occurrence of the action from the group;
    requesting an action to take for the first or second VM hosted on the computing device by the at least one user in the group;
    verifying the policy of the group;
    if the action violates the restriction,
        determining if the action is taken by the at least one user of the group;
        determining if the user belongs to a second group;
        if the user of the group belongs to the second group,
            defining a policy priority; and
            adhering to the policy with a higher priority;
        taking the measure of enforcement in response to the violation;
    if the action does not violate the restriction, sending the request to the computing device regarding the action to take for the VM.

2. The method of claim 1, further comprising storing the policy in a database.

3. The method of claim 1, wherein the restriction related to the group comprises at least one of a group-level restriction or a per-user restriction.

4. The method of claim 1, wherein the policy priority is defined as one of a non-restrictive priority; a restrictive priority; or an aggregate priority.

5. The method of claim 1, wherein the restriction comprises at least one of a resource-based restriction; a time-based restriction; or a machine-based restriction.

6. The method of claim 5, wherein the restriction comprises a limit of the aggregate physical memory used by the first VM and the second VM.

7. A system, comprising:
    a computing device;
    a first and second virtual machine (VM);
    memory in communication with said computing device when the system is operational, said memory having stored therein:
        a policy definition stored in a storage device policy specifying a group of at least one user, a restriction related to the group, the restriction comprising a restriction of aggregate use of resources across the first and second VM, and a measure of enforcement to be taken if the restriction is violated; and
        computer instructions that upon execution by the processor:
            process an action from a user in the group to be taken for at least one (VM) capable of execution on the system, said instructions verifying the action against the policy of the group;
            determine if the user belongs to a second group and if so obtaining a policy of the group assigned to the highest priority level that is violated, and
            cause a measure of enforcement to be taken in response to the violation of the restriction, the measure of enforcement comprising informing the user that the action violates the policy and informing a second user of the group that the action violates the policy.

8. The computing device of claim 7, wherein the VM self-service restriction system further comprises a policy database.

9. The computing device of claim 8, wherein the management server comprises the policy database.

10. The computing device of claim 7, wherein the restriction related to the group comprises at least one of a group-level restriction or a per-user restriction.

11. The computing device of claim 7, wherein the restriction comprises at least one of a resource-based restriction; a time-based restriction; or a machine-based restriction.

12. The computing device of claim 7, wherein the restriction is related to the creation and management of the at least one of the VMs.

13. A non-transitory computer-readable storage medium having a structure stored therein for use in a computing device the structure upon execution on a computing device causing a virtual machine (VM) self-service restriction system to perform a self-service restriction method to efficiently manage resources of a VM of being accessed by a group of at least one user, the structure causing the computing device to:
    obtain a policy from a policy store, the policy specifying the group of the at least one user, a restriction related to the group, and a measure of enforcement to be taken if the restriction is violated, the measure of enforcement comprising extending a time expiration period if the restriction is exceeded, and the restriction comprising a maximum number of VMs that the group may own or a maximum amount of time that a group may own a VM;
    request an action take for the VM hosted on the computing device or another computing device by the at least one user in the group,
    verify the policy of the group;
    if the action violates the restriction,
        determining if the action is taken by a user of the group;
        determining if the user belongs to a second group;
        if the user of the group belongs to the second group, defining a policy priority; and
adhering to the policy with a higher priority; and
taking the measure of enforcement in response to the violation; and
if the action does not violate the restriction, send the request to the computing device or the another computing device regarding the action to take for the VM.

14. The computer-readable medium of claim 13, wherein the self-service restriction method further comprises storing the policy in a database of the VM self-service restriction system.

15. The computer-readable medium of claim 13, wherein the restriction is related to the creation and management of the at least one of the VMs.

16. The computer-readable medium of claim 13, wherein the restriction comprises at least one of a group-level restriction or a per-user restriction.

* * * * *

UNITED STATES PATENT AND TRADEMARK OFFICE
CERTIFICATE OF CORRECTION

PATENT NO. : 7,996,834 B2
APPLICATION NO. : 11/404334
DATED : August 9, 2011
INVENTOR(S) : Araujo, Jr. et al.

Page 1 of 1

It is certified that error appears in the above-identified patent and that said Letters Patent is hereby corrected as shown below:

In the Claims

Column 14, line 45, in claim 13, delete "non-transitory computer-readable storage medium" and insert --computer-readable storage medium, excluding signals,-- therefor.

Signed and Sealed this
Tenth Day of June, 2014

Michelle K. Lee
*Deputy Director of the United States Patent and Trademark Office*